US 9,099,884 B2

(12) United States Patent
Jung et al.

(10) Patent No.: US 9,099,884 B2
(45) Date of Patent: Aug. 4, 2015

(54) DEVICE AND METHOD FOR CONTROLLING WIRELESS POWER SIGNAL IN WIRELESS POWER TRANSMISSION DEVICE

(75) Inventors: Chun-Kil Jung, Seoul (KR); Yoon-Sang Kuk, Gyeonggi-do (KR)

(73) Assignee: HANRIM POSTECH CO., LTD., Suwon-Si (KR)

( * ) Notice: Subject to any disclaimer, the term of this patent is extended or adjusted under 35 U.S.C. 154(b) by 818 days.

(21) Appl. No.: 13/289,158

(22) Filed: Nov. 4, 2011

(65) Prior Publication Data
US 2012/0139356 A1 Jun. 7, 2012

(30) Foreign Application Priority Data
Nov. 4, 2010 (KR) .................. 10-2010-0109184

(51) Int. Cl.
H02J 17/00 (2006.01)
H02J 7/02 (2006.01)
H01F 38/14 (2006.01)

(52) U.S. Cl.
CPC ............... *H02J 7/025* (2013.01); *H01F 38/14* (2013.01)

(58) Field of Classification Search
None
See application file for complete search history.

(56) References Cited

U.S. PATENT DOCUMENTS

| 2009/0267558 | A1 | 10/2009 | Jung | 320/108 |
| 2010/0066305 | A1* | 3/2010 | Takahashi et al. | 320/108 |
| 2011/0018360 | A1* | 1/2011 | Baarman et al. | 307/104 |
| 2011/0101791 | A1* | 5/2011 | Urano | 307/104 |
| 2011/0140653 | A1* | 6/2011 | Jung et al. | 320/108 |
| 2011/0316475 | A1* | 12/2011 | Jung et al. | 320/108 |
| 2012/0175967 | A1* | 7/2012 | Dibben et al. | 307/104 |

FOREIGN PATENT DOCUMENTS

| CN | 101179208 A | 5/2008 |
| EP | 2 066 001 A2 | 6/2009 |
| JP | 2008-283789 | 11/2008 |
| JP | 2010-233442 | 10/2010 |
| KR | 10-2009-0056548 | 6/2009 |
| WO | WO 2010067927 A1 * | 6/2010 |
| WO | WO 2010068063 A2 * | 6/2010 |

OTHER PUBLICATIONS

Chinese Office Acion issued by SIPO on Nov. 1, 2013, for the corresponding Chinese Application No. 201110345159.3.

* cited by examiner

Primary Examiner — Rexford Barnie
Assistant Examiner — David Shiao
(74) Attorney, Agent, or Firm — Stein IP, LLC

(57) ABSTRACT

Various embodiments of a method for controlling a wireless power signal in a wireless power transmission device and related devices are disclosed. In one exemplary embodiment, the method may include transmitting an object detecting signal via a transmission coil of the wireless power transmission device, receiving an object response signal in response to the object detecting signal via the transmission coil, and transmitting the wireless power signal to a wireless power receiving device via the transmission coil based on the object response signal. The method may also include detecting a voltage or a current of the transmission coil and changing the wireless power signal when a phase value of the voltage or the current of the transmission coil is changed by more than a predetermined value.

17 Claims, 4 Drawing Sheets

DEVICE AND METHOD FOR CONTROLLING WIRELESS POWER SIGNAL IN WIRELESS POWER TRANSMISSION DEVICE

CROSS-REFERENCE TO RELATED APPLICATION

This application claims priority to Korean Patent Application No. 10-2010-0109184, filed on Nov. 4, 2010, which is incorporated herein by reference in its entirety.

BACKGROUND

1. Field

The present disclosure generally relates to wireless power transmission devices and related methods. More specifically, particular embodiments of the present disclosure relate to devices and methods for controlling a wireless power signal in a wireless power transmission device and a wireless power transmission device using the same.

2. Description of Related Art

Generally, a battery pack stores electric power received from an external charging device and supplies the stored electric power to a portable device such as a cellular phone or Personal Digital Assistant (PDA) for its operation. The battery pack includes a battery cell for storing the electric power and a circuit for charging and discharging the battery cell for, for example, supplying the electric power to the portable device. To connect the charging device to the battery pack for charging, the charging device, which receives electric power from a general power source (e.g., household power outlet or car charger plug) and converts the electric power to appropriate voltage and current corresponding to the battery pack, may use a port connector to connect to a port or terminal of the battery pack to supply the electric power.

Such a connection method, however, may cause instantaneous discharge when the charging device and the battery pack make contact with or are separated from each other because the terminals in both sides of the battery pack and the charging device have a different electrical potential. The instantaneous discharge may also cause a fire when foreign substances are accumulated in the terminals.

Moreover, the electric power stored in the battery pack may be self-discharged due to moisture in the surrounding atmosphere via the terminal of the battery pack. This self-discharge may cause a reduction of an operational life and a deterioration of a performance of the battery pack.

SUMMARY

Accordingly, there is a need for an improved charging system that may obviate one or more of the above-mentioned problems or disadvantages. In particular, various exemplary embodiments of the present disclosure may provide a device and a method for controlling a wireless power signal in a wireless power transmission device that stably and efficiently supplies power in a wireless power transmission system, and a wireless power transmission device using the same.

To attain the advantages and in accordance with the purpose of the invention, as embodied and broadly described herein, one aspect of the invention may provide a method of controlling a wireless power signal in a wireless power transmission device. The method may include: transmitting an object detecting signal via a transmission coil of the wireless power transmission device; receiving an object response signal in response to the object detecting signal via the transmission coil; transmitting the wireless power signal to a wireless power receiving device via the transmission coil based on the object response signal; detecting a voltage or a current of the transmission coil; and changing the wireless power signal when a phase value of the voltage or the current of the transmission coil is changed by more than a predetermined value.

According to another exemplary aspect, changing the wireless power signal comprises resetting a driver of a transmission controller that controls the wireless power signal.

In some exemplary aspects, changing the wireless power signal comprises changing a voltage gain by changing a frequency of the wireless power signal. Alternatively or additionally, changing the wireless power signal may comprise changing an input voltage of an AC/DC inverter of the wireless power transmission device.

In another exemplary aspect, the transmission coil may comprise a first transmission coil and a second transmission coil, and changing the wireless power signal may comprise retransmitting the object detecting signal in turn via the first transmission coil and the second transmission coil. In some exemplary embodiments, the first transmission coil is a circular coil and the second transmission coil is a rectangular coil surrounding the circular coil.

According to still another aspect, the first transmission coil and the second transmission coil have substantially the same shape and size.

In yet still another exemplary aspect, the transmission coil may comprise at least one of an oval-shaped coil, a circular-shaped coil, a track-type coil, and a rounded-rectangular-shaped coil.

According to one exemplary aspect, a wireless power transmission device may comprise a transmission coil configured to transmit an object detecting signal and a wireless power signal and a transmission controller configured to monitor a current or a voltage value of the transmission coil and to change the wireless power signal when a phase value of the voltage or the current of the transmission coil is changed by more than a predetermined value.

According to another exemplary aspect, the transmission controller may be configured to reset a driver of the transmission controller when the phase value of the voltage or the current of the transmission coil is changed by more than the predetermined value.

In some exemplary aspects, the transmission controller is configured to change a voltage gain by changing a frequency of the wireless power signal when the phase value of the voltage or the current of the transmission coil is changed by more than the predetermined value.

Alternatively or additionally, the transmission controller may be configured to change an input voltage of an AC/DC inverter of the wireless power transmission device when the phase value of the voltage or the current of the transmission coil is changed by more than the predetermined value.

In still another exemplary aspect, the transmission coil may comprise a first transmission coil and a second transmission coil, and the transmission controller may be configured to retransmit the object detecting signal in turn via the first transmission coil and the second transmission coil.

According to one exemplary aspect, the transmission controller may be configured to select one of the first transmission coil and the second transmission coil and to transmit the wireless power signal via the selected transmission coil based on a response signal of the retransmitted object detecting signal.

According to another exemplary aspect, the first transmission coil comprises a circular coil, and the second transmission coil comprises a rectangular coil surrounding the circular coil.

In some exemplary aspects, the first transmission coil and the second transmission coil have substantially the same shape and size.

In another exemplary aspect, the transmission coil may comprise at least one of an oval-shaped coil, a circular-shaped coil, a track-type coil, and a rounded-rectangular-shaped coil.

Another exemplary aspect may further provide a shielding core configured to accommodate the transmission coil. In some exemplary aspects, the shielding core may comprise a ferrite material.

According to still another exemplary aspect, the transmission controller may further comprise a current sensor configured to measure the current in the transmission coil.

Additional objects and advantages of the present disclosure will be set forth in part in the description which follows, and in part will be obvious from the description, or may be learned by practice of the disclosure. The objects and advantages will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several exemplary embodiments of the present disclosure and together with the description, serve to explain the principles of the invention.

DESCRIPTION OF EMBODIMENTS

Reference will now be made in detail to the exemplary embodiments consistent with the present disclosure, examples of which are illustrated in the accompanying drawings. Wherever possible, the same reference numbers will be used throughout the drawings to refer to the same or like parts.

Figure 1:
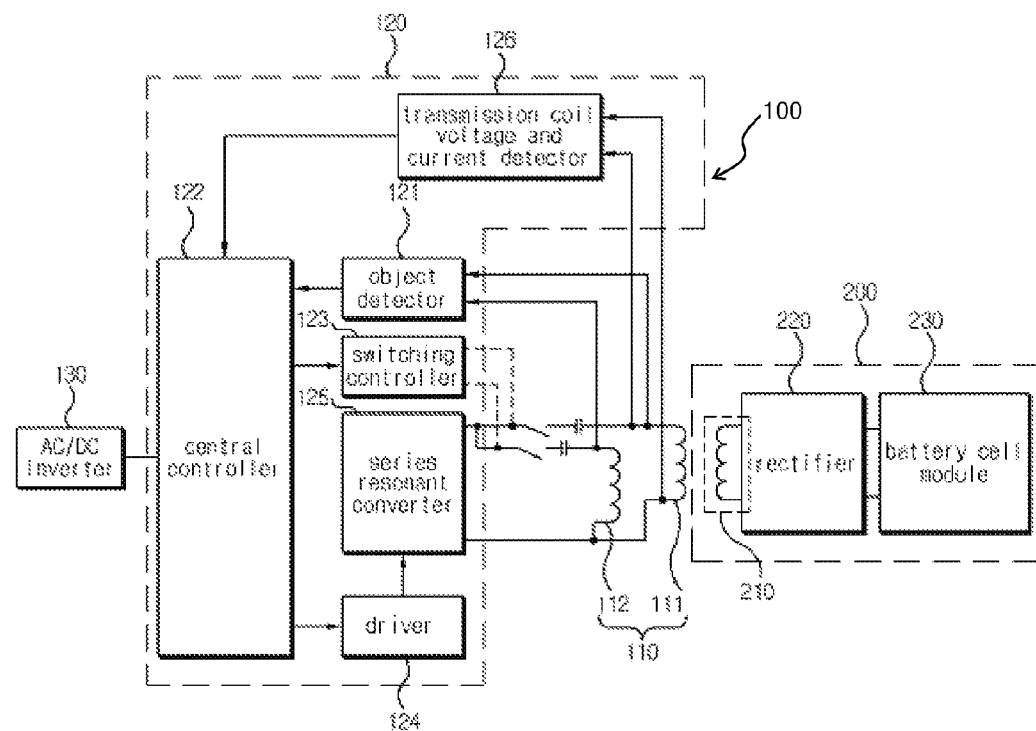
FIG. 1 is a block diagram showing a wireless power transmission system in accordance with an exemplary embodiment.

FIG. 1 is a block diagram illustrating a wireless power transmission system in accordance with an exemplary embodiment. As shown in FIG. 1, a wireless power transmission system in accordance with an exemplary embodiment may include a wireless power transmission device 100 and a wireless power receiving device 200. When the wireless power transmission device 100 transmits a wireless power signal to the wireless power receiving device 200 according to, for example, the principles of electromagnetic induction, the wireless power receiving device 200 receives the wireless power signal and charges its battery with the power of the wireless power signal. The wireless power receiving device 200 then supplies the power to one or more electronic devices connected to the wireless power receiving device 200.

Hereinafter, the exemplary configurations of the wireless power transmission device 100 and the wireless power receiving device 200 will be described in more detail.

Referring to FIG. 1, the wireless power transmission device 100 may include a transmission coil 110 and a transmission controller 120. The transmission coil 110, serving as a primary coil, is configured to transmit a wireless power signal to a receiving coil 210 of the wireless power receiving device 200 according to an electromagnetic induction method. In this exemplary embodiment, two coils, i.e., a first transmission coil 111 and a second transmission coil 112, may be implemented. The detailed configurations of the first and second transmission coils 111, 112 will be described later with reference to FIGS. 3A and 3B.

The transmission controller 120 is configured to control the operation of the transmission coil 110 and may include an object detector 121, a central controller 122, a switching controller 123, a driver 124, a series resonant converter 125, and a transmission coil voltage and current detector 126. Depending on, for example, the intended use and/or desired functionalities of the transmission controller 120, one or more of the above-listed elements may be omitted.

The object detector 121 may be configured to detect a load variation in the transmission coil 110 and determine whether the load variation is caused by the wireless power receiving device 200. For example, when a load variation is detected, the object detector 121 may be configured to confirm the identification of an object that caused the load variation to determine whether the object is indeed one of the acceptable wireless power receiving devices 200.

The object detector 121 may also be configured to perform a signal filtering to process a response signal transmitted from the wireless power receiving device 200. For example, the object detector 121 is configured to receive a response signal from an object generated in response to an object detecting signal transmitted via the transmission coil 110. The object detector 121 then performs a signal filtering to process the response signal from the object.

In addition, the object detector 121 may be configured to process a charge detecting signal transmitted via the receiving coil 210 (i.e., a secondary coil) of the wireless power receiving device 200. The charge detecting signal may comprise rectification voltage information measured in a rectifier 220 of the wireless power receiving device 200.

The central controller 122 is configured to receive a determination result of the object detector 121 to confirm whether the object is a wireless power receiving device 200 and analyze the object response signal received in the transmission coil 110 to transmit a power signal for transmitting a wireless power signal via the transmission coil 110 to the driver 124.

The central controller 122 may also be configured to determine phase value information obtained from the transmission coil voltage and current detector 126. Based on the phase value information, the central controller 122 may control the driver 124 to change the wireless power signal.

The central controller 122 may be configured to analyze a data signal filtered in the object detector 121 and the transmission coil voltage and current detector 126, and control the driver 124 corresponding to the analyzed data signal. Also, the central controller 122 may generate an object detecting signal to transmit it to the wireless power receiving device 200 via the transmission coil 110.

The switching controller 123 may be configured to control a switching operation of a switch disposed between the series resonant converter 125 and the first and second transmission coils 111, 112.

The driver 124 is configured to control the operation of the series resonant converter 125 under the control of the central controller 122.

The series resonant converter 125, operated under the control of the driver 124, is configured to generate the transmission power for use by the transmission coil 110 to generate a desired power signal. More specifically, when the central controller 122 transmits a power control signal to the driver 124 for transmitting a power signal corresponding to a desired power level to the power receiving device 200, the driver 124 controls, based on the transmitted power control signal, the operation of the series resonant converter 125 to generate the desired power signal. The series resonant converter 125 then supplies the transmission power corresponding to the desired power level, under the control of the driver 124, to the transmission coil 110 in order to generate and transmit the wireless power signal having the required power level.

In addition, the series resonant converter 125 may be configured to supply power for generating a first object detecting signal and a second object detecting signal via the first transmission coil 111 and the second transmission coil 112, respectively, under the control of the driver 124.

The transmission coil voltage and current detector 126 is configured to detect a phase value of a voltage or a current of the transmission coil 110. When the wireless power receiving device 200 is moved from one charging location to another, the phase value of the voltage or the current of the transmission coil 110 may change. Thus, the movement of the wireless power receiving device 200 can be detected by detecting the phase value of the voltage or the current of the transmission coil 110.

When the detected phase value is greater than a predetermined value, the central controller 122 may change a frequency of the wireless power signal by controlling the driver 124. Alternatively or additionally, the central controller 122 may lower an input voltage by controlling an AC/DC inverter 130 and/or may initialize the transmission controller 120 by resetting the driver 124.

In addition to the transmission coil voltage and current detector 126, the transmission controller 120 may further include a current transformer (not shown) for detecting a current value in the transmission coil 110 to more sensitively and precisely detect a movement or position of the wireless power receiving device 200 on the wireless power transmission device 100.

The AC/DC inverter 130 is configured to change AC power of 220V or 110V into DC power of a predetermined voltage. As described above, its output voltage value is changed under the control of the central controller 122.

The wireless power receiving device 200 is configured to receive a power signal from the wireless power transmission device 100. The wireless power receiving device 200 may include the receiving coil 210, a rectifier 220, and a battery cell module 230. The receiving coil 210 is configured to receive a transmitted power signal and generate an inductive power from the transmitted power signal. The rectifier 220 is configured to rectify the inductive power, and the battery cell module 230 is configured to charge a battery cell (not shown) with the rectified power.

The battery cell module 230 is configured to include protection circuits, such as, for example, an overvoltage and/or overcurrent protection circuit and a temperature detection circuit. The battery cell module 230 may also include a charging management module for collecting and processing information relating to a charging state of the battery cell.

Hereinafter, an exemplary method of selecting and controlling a power transmission coil in a wireless power transmission device having a plurality of coils will be described in more detail.

Figure 2:
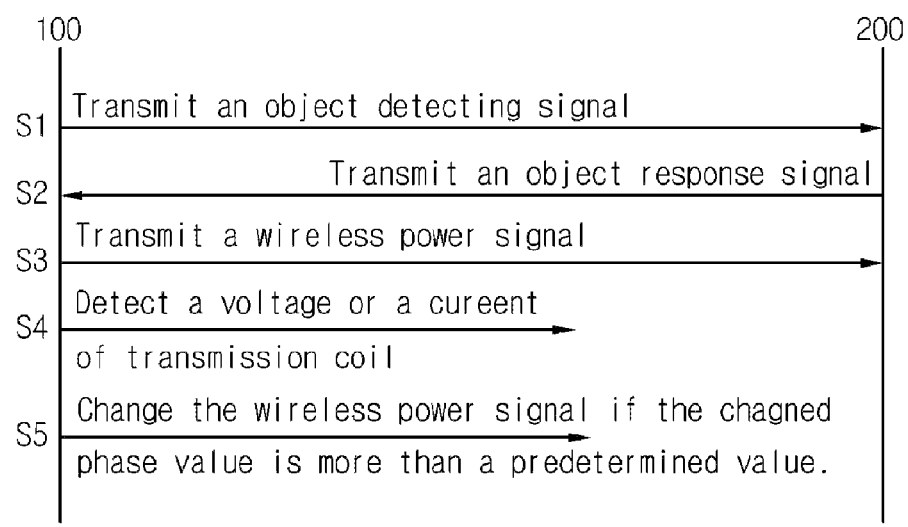
FIG. 2 is a flowchart describing a method for controlling a wireless power signal in a wireless power transmission device in accordance with an exemplary embodiment.

FIG. 2 is a flowchart describing a method for controlling a wireless power signal in a wireless power transmission device in accordance with an exemplary embodiment. As shown in FIG. 2, the transmission coil 110 of the wireless power transmission device 100 transmits an object detecting signal to the wireless power receiving device 200 at Step S1. In response to the object detecting signal, the wireless power receiving device 200 transmits an object response signal, and the wireless power transmission device 100 receives the object response signal via the transmission coil 110 at Step S2.

At Step 3, the transmission controller 120 transmits a wireless power signal to the wireless power receiving device 200 via the transmission coil 110 based on the object response signal. Meanwhile, the transmission coil voltage and current detector 126 of the transmission controller 120 may detect voltage or current of the transmission coil 110 at Step S4. If the change in the detected phase value of the voltage or the current of the transmission coil 110 is greater than a predetermined value (e.g., representing radical change of the phase value), the transmission controller 120 may change the wireless power signal at Step S5.

For example, when the phase value of the voltage or the current is changed by more than a predetermined value, the transmission controller 120 may be reset by resetting the driver 124 of the transmission controller 120. Otherwise, the transmission controller 120 may change a voltage gain by changing the frequency of the wireless power signal. Thus, the transmission controller may change the voltage gain level to increase or decrease the voltage value detected in the rectifier 220 of the wireless power receiving device 200.

Alternatively or additionally, if the phase value of the voltage or the current of the transmission coil 110 is changed by more than a predetermined value, the transmission controller may increase or decrease the input voltage from the AC/DC inverter 130 of the wireless power transmission device 100.

If the transmission coil 110 comprises two coils (e.g., a first transmission coil 111 and a second transmission coil 112), the transmission controller 120 may retransmit the object detecting signal in turn via the first transmission coil 111 and the second transmission coil 112 after resetting the transmission controller 120, and transmits the wireless power signal again by selecting any one of the first transmission coil 111 and the second transmission coil 112 based on a response signal received in response to the object detecting signal.

With the above-described configuration, the power can be stably supplied to a wireless power receiving device, thereby protecting the power receiving device, even if voltage is suddenly increased due to a movement of the wireless power receiving device 200 from a peripheral portion to a central portion of the transmission coil 110.

Figure 3A:
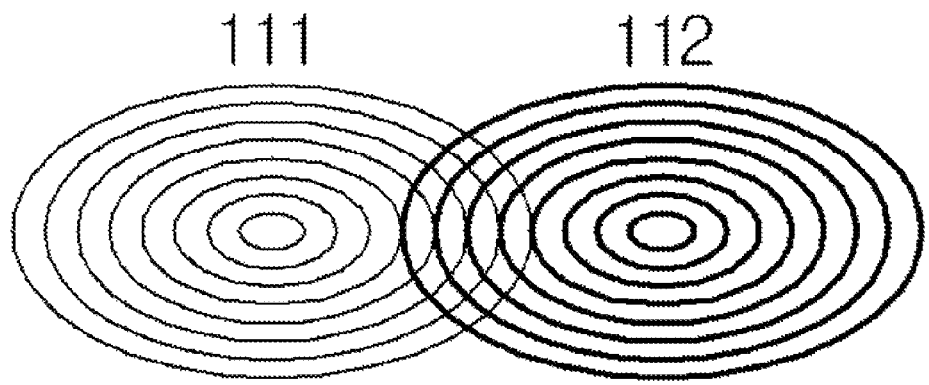
FIGS. 3A and 3B show a structure of a plurality of coils used in the wireless power transmission device of an exemplary embodiment.
Figure 3B:
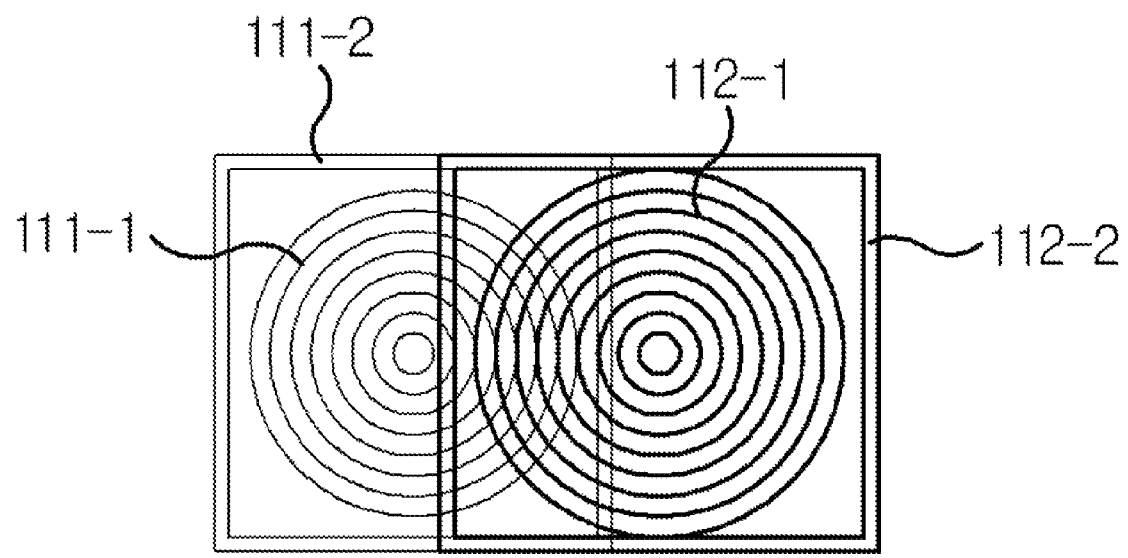

With reference to FIGS. 3A and 3B, exemplary embodiments of the transmission coils are described herein. FIGS. 3A and 3B show a structure of a plurality of transmission coils 111, 112 used in a wireless power transmission device 100 in accordance with an exemplary embodiment.

As shown in FIG. 3A, one exemplary embodiment of the transmission coil 110 may include a first transmission coil 111 and a second transmission coil 112 having the same shape and size. The first and second transmission coils 111, 112 may be disposed to have an overlapped region.

In some exemplary embodiments, the first transmission coil 111 and the second transmission coil 112 may have various geometrical shape, such as, for example, oval shape, circular shape, track shape, and rounded-rectangular shape. In some embodiments, the first and second transmission coils 111, 112 may have shapes, types, and/or sizes different from one another.

According to another exemplary embodiment, each of the first transmission coil 111 and the second transmission coil 112 may have a combined structure of a circular coil and a rectangular coil. For example, as shown in FIG. 3B, each of the first and second transmission coils 111, 112 comprises circular coils 111-1, 112-1 disposed inside and rectangular coils 111-2, 112-2 disposed outside and surrounding the circular coils 111-1, 112-1.

The transmission coil having different combination of coils may have advantageous effects from the combination. For example, the transmission coil shown in FIG. 3B may result in an efficient power transmission, which is an advantage of a circular coil, and mobility or position-free, which is an advantage of a rectangular coil. Accordingly, the transmission coil of FIG. 3B may reduce a dead zone, in which the wireless power receiving device 200 do not receive the power, and maintain the power transmission efficiency at the same time.

Figure 4A:
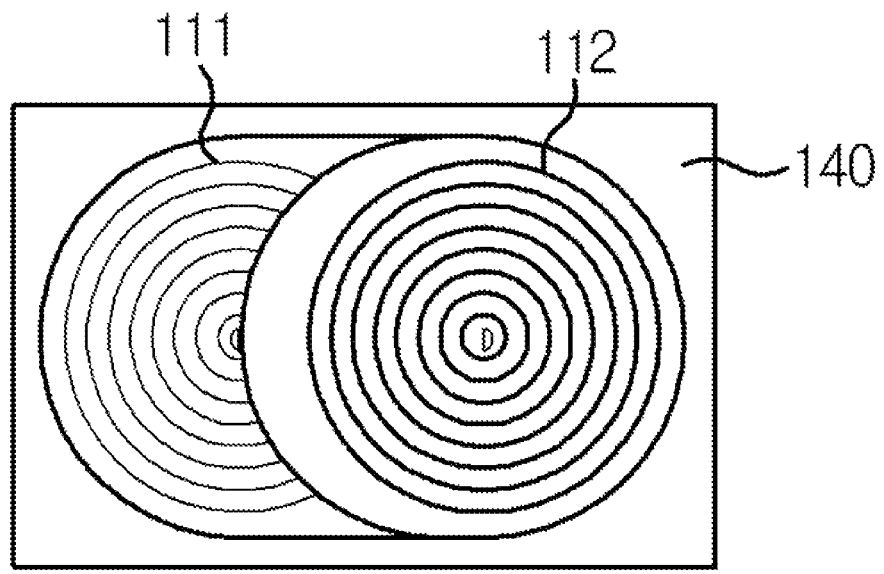
FIG. 4A is a plan view showing a shielding core accommodating a plurality of coils used in the wireless power transmission device in accordance with an exemplary embodiment.
Figure 4B:
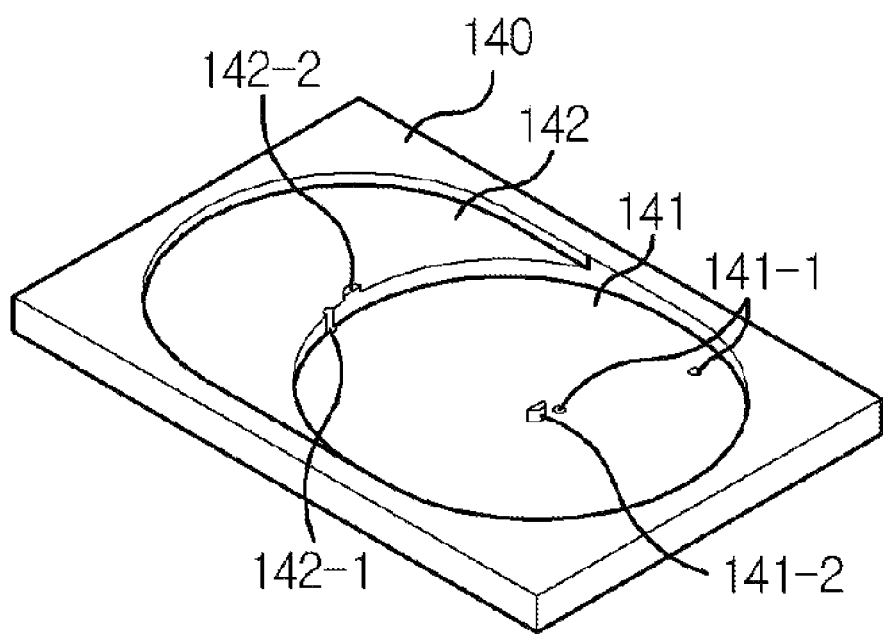
FIG. 4B is a perspective view showing a shielding core accommodating a plurality of coils used in the wireless power transmission device in accordance with an exemplary embodiment.

Hereinafter, a transmission shielding core, to which an oval-shaped coil shown in FIG. 3A is placed, will be described in detail with reference to FIGS. 4A and 4B. FIG. 4A is a plan view showing a shielding core 140 configured to accommodate a plurality of coils used in a wireless power transmission device 100 in accordance with an exemplary embodiment. FIG. 4B is a perspective view of the shielding core 140 of FIG. 4A.

As shown in FIGS. 4A and 4B, the shielding core 140 may have a shape of a rectangular plate. The shielding core 140 may also have many other shapes and sizes. The shielding core 140 may include a first concave portion 141 configured to receive a first transmission coil 111 and a second concave portion 142 configured to receive a second transmission coil 112. A step difference may be formed between the first concave portion 141 and the second concave portion 142.

On a side surface and/or a center of each concave portion 141, 142, the shielding core 140 may include one or more holes 141-1, 142-1 through which a lead wire can be inserted.

The shielding core 140 may include one or more fixing portions 141-2, 142-2 to fixedly receive the transmission coils. In the exemplary embodiment shown in FIGS. 4A and 4B, each of the fixing portions 141-2, 142-2 is a protrusion extending from each center of the concave portions 141, 142, respectively.

The shielding core 140 may include at least one of amorphous ferrite, Mn—Zn (50:50 parts by weight), Ni—Fe (80:20 parts by weight), and fine-metal (Fe—Si—Cu—Nb).

The shielding core 140 may prevent the damage to the controller of the wireless power transmission device due to a magnetic field generating from the first transmission coil 111 and the second transmission coil 112, and increase the power transmission efficiency.

Figure 5:
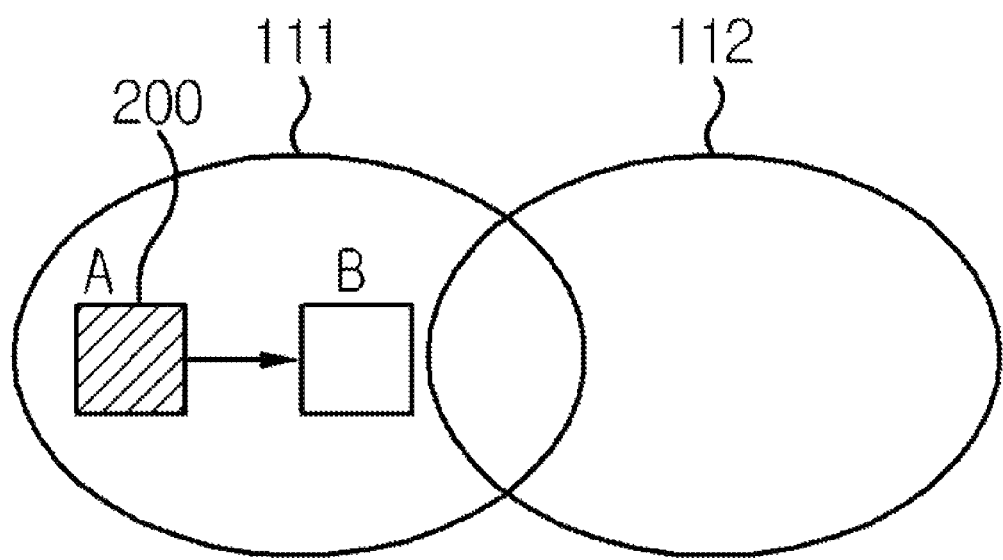
FIG. 5 is a conceptual illustration describing an effect occurring in a case that the wireless power signal controlling method is applied to the wireless power transmission device in accordance with an exemplary embodiment.

FIG. 5 is a conceptual illustration describing an exemplary effect occurring when the wireless power signal controlling method of the present disclosure is applied to a wireless power transmission device.

As shown in FIG. 5, when the wireless power receiving device 200 is placed in position A, the wireless power receiving device 200 receives a wireless power signal via the first transmission coil 111. If the wireless power receiving device 200 is rapidly moved to position B toward the center of the first transmission coil 111, and the power is not controlled by the wireless power transmission device 100, the voltage of the wireless power receiving device 200 may increase excessively to cause problems such as damage to the wireless power receiving device 200 or explosion of the battery cell module 230.

When a method for controlling the wireless power signal consistent with the present disclosure is applied, the above-mentioned problems may be resolved by, for example, detecting the change of the phase value of the current or the voltage, which occurs due to momentary movement of the wireless power receiving device 200 and is measured in the transmission coil 110, and resetting the transmission controller based on the detected change. The above-mentioned problem may be also resolved by changing a voltage gain or lowering an input voltage value, which is output from the AC/DC inverter.

According to the above-described configurations and related methods, even if voltage is suddenly increased due to a movement of the wireless power receiving device from a peripheral portion of the transmission coil to the central portion of the transmission coil, the power can be stably supplied to the wireless power receiving device, thereby protecting the wireless power receiving device.

While certain embodiments have been described above, it will be understood to those skilled in the art that the embodiments described are by way of example only. Accordingly, the device and method described herein should not be limited based on the described embodiments. Rather, the apparatus described herein should only be limited in light of the claims that follow when taken in conjunction with the above description and accompanying drawings.

What is claimed is:

1. A method of controlling a wireless power signal in a wireless power transmission device, comprising:
    transmitting an object detecting signal via a transmission coil of the wireless power transmission device;
    receiving an object response signal in response to the object detecting signal via the transmission coil;
    transmitting the wireless power signal to a wireless power receiving device via the transmission coil based on the object response signal;
    detecting a voltage or a current of the transmission coil;
    detecting a movement of the wireless power receiving device by detecting change of a phase value of the voltage or the current of the transmission coil; and
    changing the wireless power signal if the movement of the wireless power receiving device is detected,
    wherein the transmission coil comprises a first transmission coil and a second transmission coil, and
    wherein the changing of the wireless power signal comprises:
    retransmitting the object detecting signal in turn via the first transmission coil and the second transmission coil; and
    retransmitting the wireless power signal by selecting any one of the first transmission coil and the second transmission coil based on the object response signal received in response to the object detecting signal.

2. The method of claim 1, wherein changing the wireless power signal comprises resetting a driver of a transmission controller that controls the wireless power signal.

3. The method of claim 1, wherein changing the wireless power signal comprises changing a voltage gain by changing a frequency of the wireless power signal.

4. The method of claim 1, wherein changing the wireless power signal comprises changing an output voltage of an AC/DC rectifier of the wireless power transmission device.

5. The method of claim 1, wherein the first transmission coil is a circular coil and the second transmission coil is a rectangular coil surrounding the circular coil.

6. The method of claim 1, wherein the first transmission coil and the second transmission coil have substantially the same shape and size.

7. The method of claim 1, wherein the transmission coil comprises at least one of an oval-shaped coil, a circular-shaped coil, a track-type coil, and a rounded-rectangular-shaped coil.

8. A wireless power transmission device comprising:
- a transmission coil configured to transmit an object detecting signal and a wireless power signal; and
- a transmission controller configured to monitor a movement of a wireless power receiving device by detecting change of a phase value of the current or the voltage of the transmission coil and to change the wireless power signal when the movement of the wireless power receiving device is detected,
- wherein the transmission coil comprises a first transmission coil and a second transmission coil, and
- wherein to change the wireless power signal the transmission controller is configured to retransmit the object detecting signal in turn via the first transmission coil and the second transmission coil, and configured to select any one of the first transmission coil and the second transmission coil and transmit the wireless power signal via the selected transmission coil based on a response signal of the retransmitted object detecting signal.

9. The device of claim 8, wherein the transmission controller is configured to reset a driver of the transmission controller when the phase value of the voltage or the current of the transmission coil is changed by more than the predetermined value.

10. The device of claim 8, wherein the transmission controller is configured to change a voltage gain by changing a frequency of the wireless power signal when the phase value of the voltage or the current of the transmission coil is changed by more than the predetermined value.

11. The device of claim 8, wherein the transmission controller is configured to change an output voltage of an AC/DC rectifier of the wireless power transmission device when the phase value of the voltage or the current of the transmission coil is changed by more than the predetermined value.

12. The device of claim 8, wherein the first transmission coil is a circular coil and the second transmission coil is a rectangular coil surrounding the circular coil.

13. The device of claim 8, wherein the first transmission coil and the second transmission coil have substantially the same shape and size.

14. The device of claim 8, wherein the transmission coil comprises at least one of an oval-shaped coil, a circular-shaped coil, a track-type coil, and a rounded-rectangular-shaped coil.

15. The device of claim 8, further comprising a shielding core configured to accommodate the transmission coil therein.

16. The device of claim 15, wherein the shielding core comprises a ferrite material.

17. The device of claim 8, wherein the transmission controller further comprises a current sensor configured to measure the current in the transmission coil.

\* \* \* \* \*